(12) United States Patent
Disser

(10) Patent No.: US 7,210,049 B2
(45) Date of Patent: Apr. 24, 2007

(54) CONTROLLER AREA NETWORK WAKE-UP SYSTEM AND METHOD

(75) Inventor: Robert J. Disser, Dayton, OH (US)

(73) Assignee: Delphi Technologies, Inc., Troy, MI (US)

(*) Notice: Subject to any disclaimer, the term of this patent is extended or adjusted under 35 U.S.C. 154(b) by 425 days.

(21) Appl. No.: 10/762,932

(22) Filed: Jan. 21, 2004

(65) Prior Publication Data

US 2005/0160301 A1  Jul. 21, 2005

(51) Int. Cl.
*G06F 1/26* (2006.01)
(52) U.S. Cl. .......................................... 713/324; 701/36
(58) Field of Classification Search ................ 713/324; 180/271; 701/36
See application file for complete search history.

(56) References Cited

U.S. PATENT DOCUMENTS

| | | | |
|---|---|---|---|
| 5,726,541 A * | 3/1998 | Glenn et al. .................. 318/16 |
| 6,282,668 B1 * | 8/2001 | Neudecker ................... 713/324 |
| 6,405,330 B1 * | 6/2002 | Hanf et al. ................... 714/712 |
| 2004/0145500 A1 * | 7/2004 | Huebl ......................... 340/994 |

* cited by examiner

*Primary Examiner*—Chun Cao
*Assistant Examiner*—Albert Wang
(74) *Attorney, Agent, or Firm*—Scott A. McBain

(57) ABSTRACT

A controller area network employs a CAN bus for facilitating CAN communications among a plurality of communication controllers switched to an active state. The controller area network further employs a CAN wake-up controller for switching one or more communication controllers to the active state in response to an application of a non-interfering communication biasing signal to said CAN bus. Upon a termination of the application of a non-interfering communication biasing signal to said CAN bus, the CAN wake-up controller switches the communication controller(s) to an inactive state for impeding CAN communications by communication controller(s) via the CAN bus.

21 Claims, 10 Drawing Sheets

CONTROLLER AREA NETWORK WAKE-UP SYSTEM AND METHOD

TECHNICAL FIELD OF THE INVENTION

The present invention generally relates to a controller area networks ("CAN"). The present invention specifically relates to an operation of a CAN bus as a communication bus and a wake-up bus.

BACKGROUND OF THE INVENTION

A CAN bus as known in the art facilitates communications among various communication controllers of a CAN network. FIG. 1 illustrates exemplary conventional CAN communications involving an electrical communication of an operational signal $V_{OS}$ (e.g., a brake pedal signal) from a master device 20 (e.g., a brake pedal sensor) to a master communication controller 30, which in turn electrically communicates a master communication $V_{MC}$ (e.g., desired brake force) to a CAN bus 40. The master communication $V_{MC}$ is addressed to a slave communication controller 50, which receives the master communication $V_{MC}$ via CAN bus 40 and in turn electrically communicates an actuation signal (e.g., brake force signal) to a slave device 60 (e.g., a brake). Slave device 60 electrically communicates a brake feedback signal $V_{FB}$ to slave communication controller 50, which in turn electrically communicates a slave communication $V_{SC}$ (e.g., a brake feedback signal) to CAN bus 40. The slave communication $V_{SC}$ is addressed to master communication controller 30, which receives the slave communication $V_{SC}$ via CAN bus 40.

In FIG. 1, communication controllers 30 and 50 are operating in an active state that enables communication controllers 30 and 50 to participate in CAN communications $V_{MC}$ and $V_{SC}$ via CAN bus 40. Communication controllers 30 and 50 are typically switched to the active state whenever there is a need to conduct CAN communications $V_{MC}$ and $V_{SC}$ via CAN bus 40 (e.g., a vehicle is operating in a condition other than "key off" condition). Conversely, an inactive state prohibits communication controllers 30 and 50 from participating in CAN communications $V_{MC}$ and $V_{SC}$ via CAN bus 40. Communication controllers 30 and 50 are typically switched to the inactive state whenever there is a lack of need to conduct CAN communications $V_{MC}$ and $V_{SC}$ via CAN bus 40 (e.g., a vehicle is operating in the "key off" condition).

It is known in the art to require slave communication controller 50 to remain continuously connected to a battery during an inactive state to thereby draw a quiescent current whereby slave communication controller 50 can wake-up (i.e., switch to the active state) on its own initiative to receive the master communication $V_{MC}$ from master communication controller 30. In one known implementation, the quiescent current enables slave communication controller 50 to periodically wake-up to thereby check for the master communication $V_{MC}$ from master communication controller 30. In another known implementation, the quiescent current enables slave communication controller 50 to incorporate a special CAN transceiver integrated circuit for continuously monitoring CAN bus 40 for the master communication $V_{MC}$ from master communication controller 30.

SUMMARY OF THE INVENTION

The present invention improves upon the prior art by eliminating the need to draw the quiescent current during an inactive state of a communication controller, and by reducing the complexity of a communication controller.

One form of the present invention is a controller area network employing a CAN bus, a plurality of communication controllers in electrical communication with the CAN bus, and a CAN wake-up controller in electrical communication with the CAN bus and one or more of the communication controllers. The CAN bus facilitates CAN communications among the communication controllers. In an active state, a communication controller can participate in CAN communications among the communication controllers via the CAN bus. Conversely, in an inactive state, a communication controller is prohibited from participating in CAN communications among the communication controllers via the CAN bus. The CAN wake-up controller switches the one or more communication controllers to the active state in response to an application of the non-interfering communication biasing signal to the CAN bus. Conversely, the CAN wake-up controller switches the one or more communication controllers to the inactive state in response to a termination of the application of the non-interfering communication biasing signal to the CAN bus.

In one aspect, one of the communication controllers (e.g., a master communication controller) can be operated to apply the non-interfering communication biasing signal to the CAN bus.

The term "non-interfering communication biasing signal" encompasses a signal for establishing a voltage on the CAN bus that does not interfere with normal CAN communications as is well known in the art.

The terms "electrical communication" and "electrically communicating" encompass an electrical connection, an electrical coupling or any other technique for electrically interfacing devices (e.g., the CAN bus and the communication controller).

A second form of the present invention is a method of operating a controller area network employing a CAN bus and a plurality of communication controllers. First, a non-interfering communication biasing signal is applied to the CAN bus. Second, one or more of the communication controllers are switched to an active state in response to the application of the non-interfering communication biasing signal to the CAN bus.

The foregoing forms, and other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

The present invention will now be described, by way of example, with reference to the accompanying drawings, in which.

DETAILED DESCRIPTION OF THE PRESENTLY PREFERRED EMBODIMENTS

Figure 2:
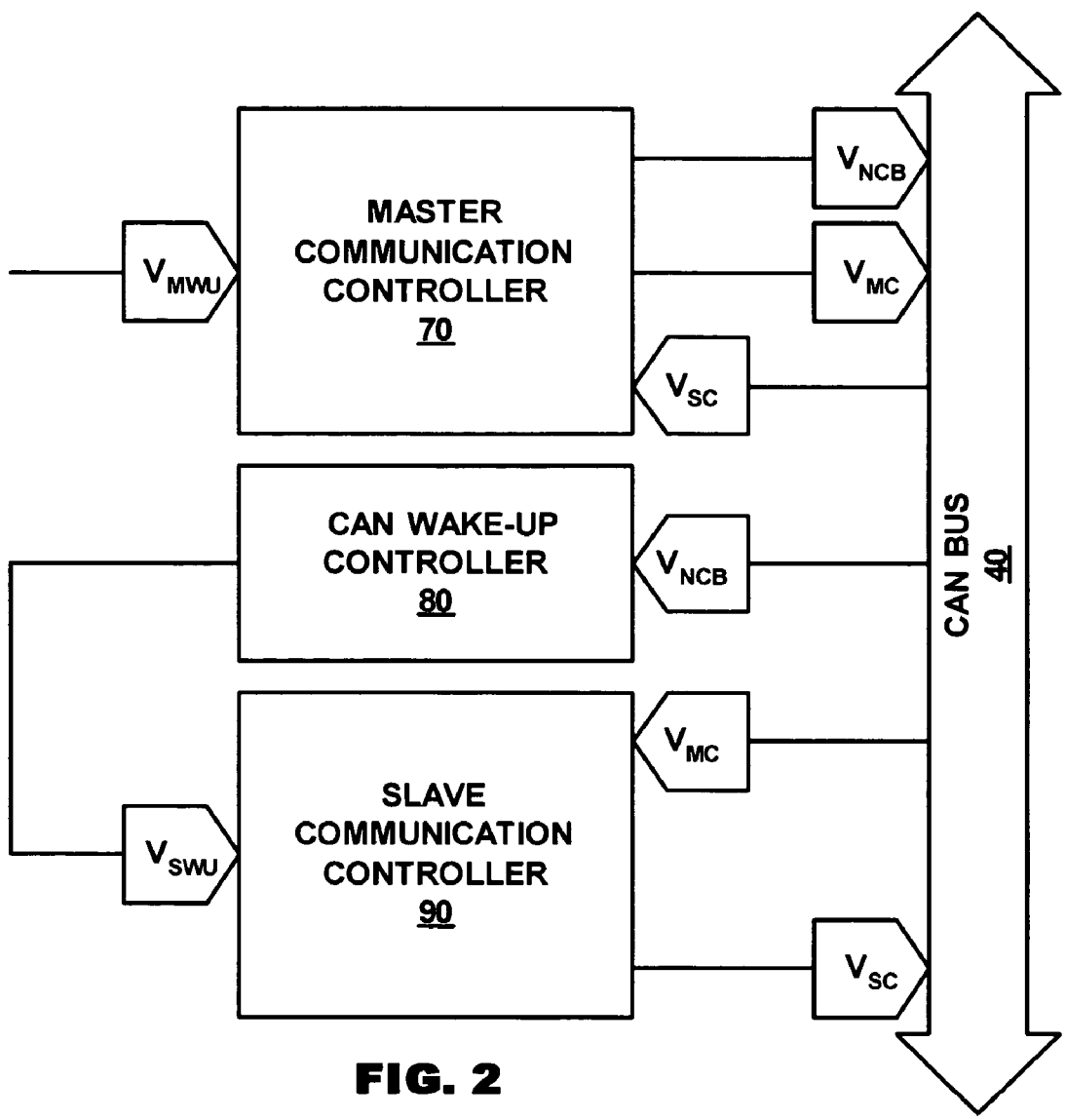
FIG. 2 illustrates a first embodiment in accordance with the present invention of a master controller and a slave controller of a CAN network.

FIG. 2 illustrates a master communication controller 70 and a slave communication controller 90 in an active state whereby controllers 70 and 90 are participating in CAN communications $V_{MC}$ and $V_{SC}$ via CAN bus 40. To this end, a master wake-up signal $V_{MWU}$ indicative of an operational requirement for master communication controller 70 to be switched to the active state is electrically communicated to master communication controller 70. The timing of when master wake-up signal $V_{MWU}$ is or is not electrically communicated to master communication controller 70 is irrelevant for purposes of understanding the principles of the present invention. However, those skilled in the art will appreciate various time periods that are suitable to electrically communicate master wake-up signal $V_{MWU}$ to master communication controller 70 (e.g., any time other than a "key-off" condition for a vehicle). Additionally, the source of master wake-up signal $V_{MWU}$ is irrelevant for purposes of understanding the principles of the present invention. However, those skilled in the art will appreciate various sources that may serve to electrically communicate master wake-up signal $V_{MWU}$ to master communication controller 70 (e.g., a switch connected to an ignition of a vehicle).

Figure 1:
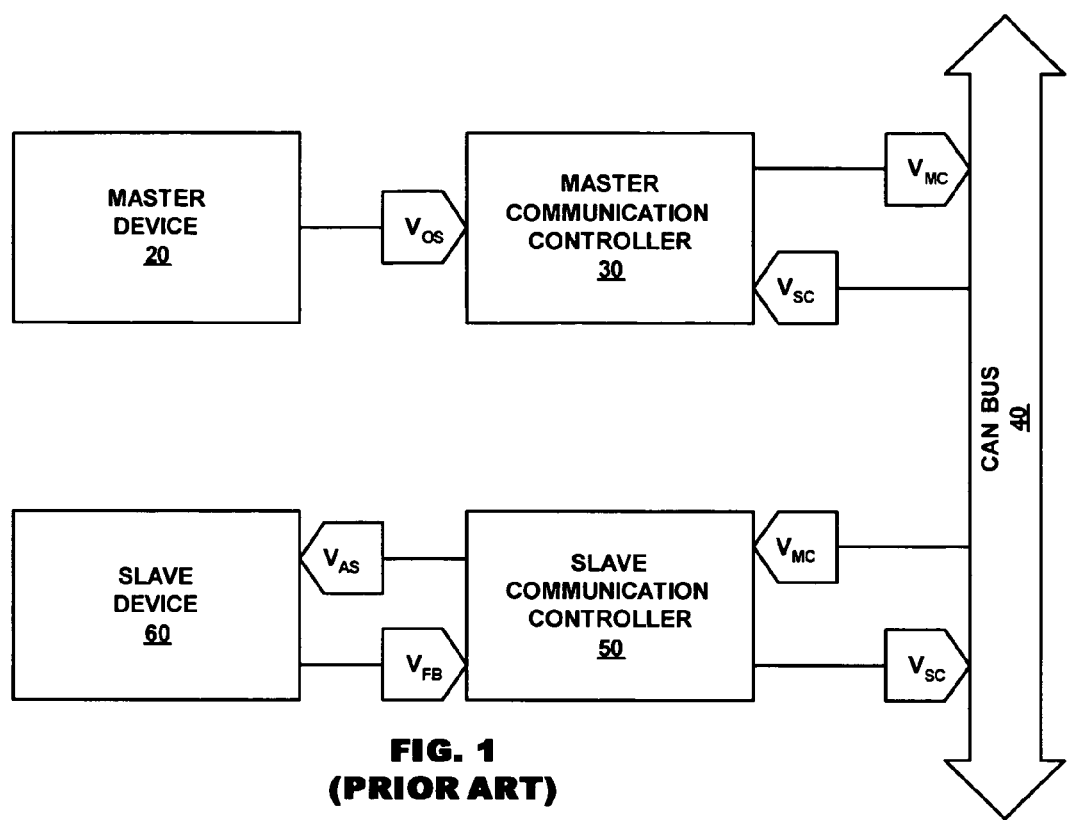
FIG. 1 illustrates a conventional CAN communication between a master communication controller and a slave communication controller.

Upon and during an electrical communication of master wake-up signal $V_{MWU}$, master communication controller 70 is structurally configured to implement conventional CAN techniques to thereby facilitate a participation by master communication controller 70 in CAN communications $V_{MC}$ and $V_{SC}$ via CAN bus 40 as well as a participation by master communication controller 70 in any other necessary operational communications (e.g., communications with master device 20 illustrated in FIG. 1). Master communication controller 70 is further structurally configured in a new and unique manner to generate a non-interfering communication biasing signal $V_{NCB}$ as an indication of being switched to the active state. Upon and during a generation of non-interfering communication biasing signal $V_{NCB}$, master communication controller 70 applies non-interfering communication biasing signal $V_{NCB}$ to CAN bus 40. In an embodiment of CAN bus 40 having two (2) conventional bus lines, master communication controller 70 applies non-interfering communication biasing signal $V_{NCB}$ as a voltage equal to a normal recessive voltage of CAN bus 40 (e.g., 2.5 volts).

The magnitude of the non-interfering communication biasing signal $V_{NCB}$ is insufficient to interfere in CAN communications $V_{MC}$ and $V_{SC}$ between controllers 70 and 90 via CAN bus 40, yet sufficient to be detected by CAN wake-up controller 80. To this end, CAN wake-up controller 80 is structurally configured to generate a slave wake-up signal $V_{SWU}$ as an indication of a detection of an application of non-interfering communication biasing signal $V_{NCB}$ by master communication controller 70 to CAN bus 40.

Upon and during a generation of slave wake-up signal $V_{SWU}$, CAN wake-up controller 80 electrically communicates slave wake-up signal $V_{SWU}$ to slave communication controller 90, which is structurally configured to implement conventional CAN techniques upon and during an electrical communication of slave wake-up signal $V_{SWU}$ to thereby facilitate a participation by slave communication controller 90 in CAN communications $V_{MC}$ and $V_{SC}$ via CAN bus 40 as well as a participation by slave communication controller 90 in any other necessary operational communications (e.g., communications with slave device 60 illustrated in FIG. 1).

Figure 3:
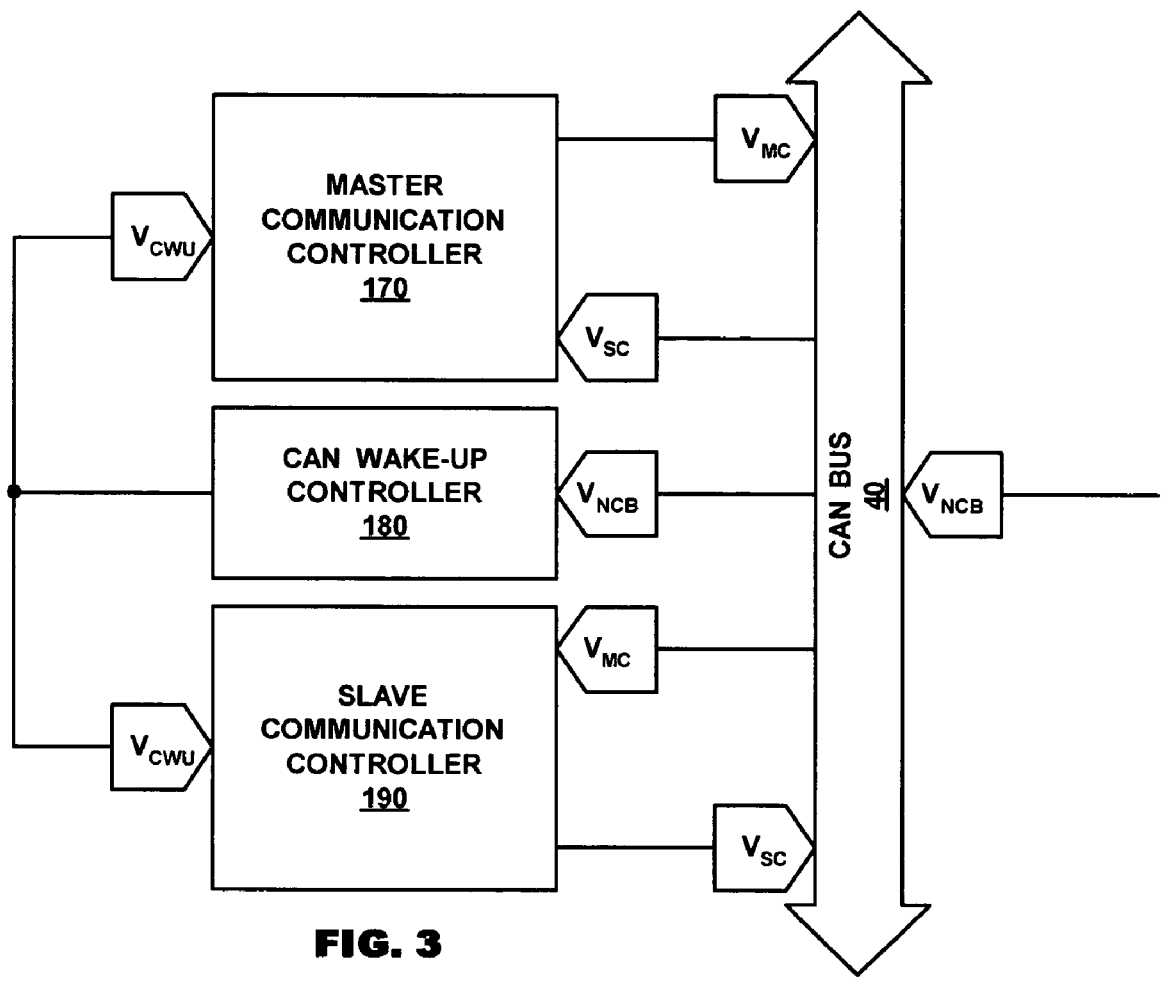
FIG. 3 illustrates a second embodiment in accordance with the present invention of a master controller and a slave controller of a CAN network.

In an alternative embodiment to FIG. 2, FIG. 3 illustrates an application of non-interfering communication biasing signal $V_{NCB}$ to CAN bus 40 from a source that is irrelevant for purposes of understanding the principles of the present invention. However, those skilled in the art will appreciate various sources that may serve to apply non-interfering communication biasing signal $V_{NCB}$ to CAN bus 40 (e.g., a voltage divider connected to a battery of a vehicle during time periods other than a "key-off" condition).

In this embodiment, a CAN wake-up controller 180 is structurally configured to generate a CAN wake-up signal $V_{CWU}$ as an indication of a detection of an application of non-interfering communication biasing signal $V_{NCB}$ to CAN bus 40. Upon and during a generation of CAN wake-up signal $V_{CWU}$, CAN wake-up controller 180 electrically communicates CAN wake-up signal $V_{CWU}$ to a master communication controller 170 and a slave communication controller 190, both of which are structurally configured to implement conventional CAN techniques upon and during the electrical communication of CAN wake-up signal $V_{CWU}$ to thereby facilitate a participation by communication controllers 170 and 190 in CAN communications $V_{MC}$ and $V_{SC}$ via CAN bus 40 as well as a participation by communication controllers 170 and 190 in any other necessary operational communications.

As compared to master communication controller 70 (FIG. 2), the structural configuration of master communication controller 170 (FIG. 3) can either (1) omit the capability of applying non-interfering communication biasing signal $V_{NCB}$ to CAN bus 40, (2) provide for a selective activation/deactivation of the capability of applying non-interfering communication biasing signal $V_{NCB}$ to CAN bus 40, or (3) provide for a capability of applying a portion of non-interfering communication biasing signal $V_{NCB}$ to CAN bus 40 while the remaining portion of non-interfering communication biasing signal $V_{NCB}$ is applied to CAN bus 40 by another source.

Referring to FIGS. 2 and 3, each controller can employ one or more components that are assembled as a common unit, and for the multiple component units, the components of each controller may be distributed throughout the controller area network. The component(s) of each controller may employ digital circuitry, analog circuitry, or both (e.g. an application specific integrated circuit). Also, the component(s) of each controller may be programmable hardware, a dedicated state machine, or a hybrid combination of programmable and dedicated hardware. Additionally, all signals illustrated in FIGS. 2 and 3 can be in analog form or in digital form, and can be generated as a voltage or a current. Furthermore, to implement the principals of the present invention, each controller can further employ any control clocks, interfaces, signal conditioners, filters, Analog-to-Digital (A/D) converters, Digital-to-Analog (D/A) converters, communication ports, or other types of operators as would occur to those having ordinary skill in the art.

In practice, the structural configurations of the controllers illustrated in FIGS. 2 and 3 are dependent upon the commercial implementations of the controllers. The inventor of the present invention therefore does not place any restrictions as to the structural configurations of controllers illustrated in FIGS. 2 and 3.

Figure 4:
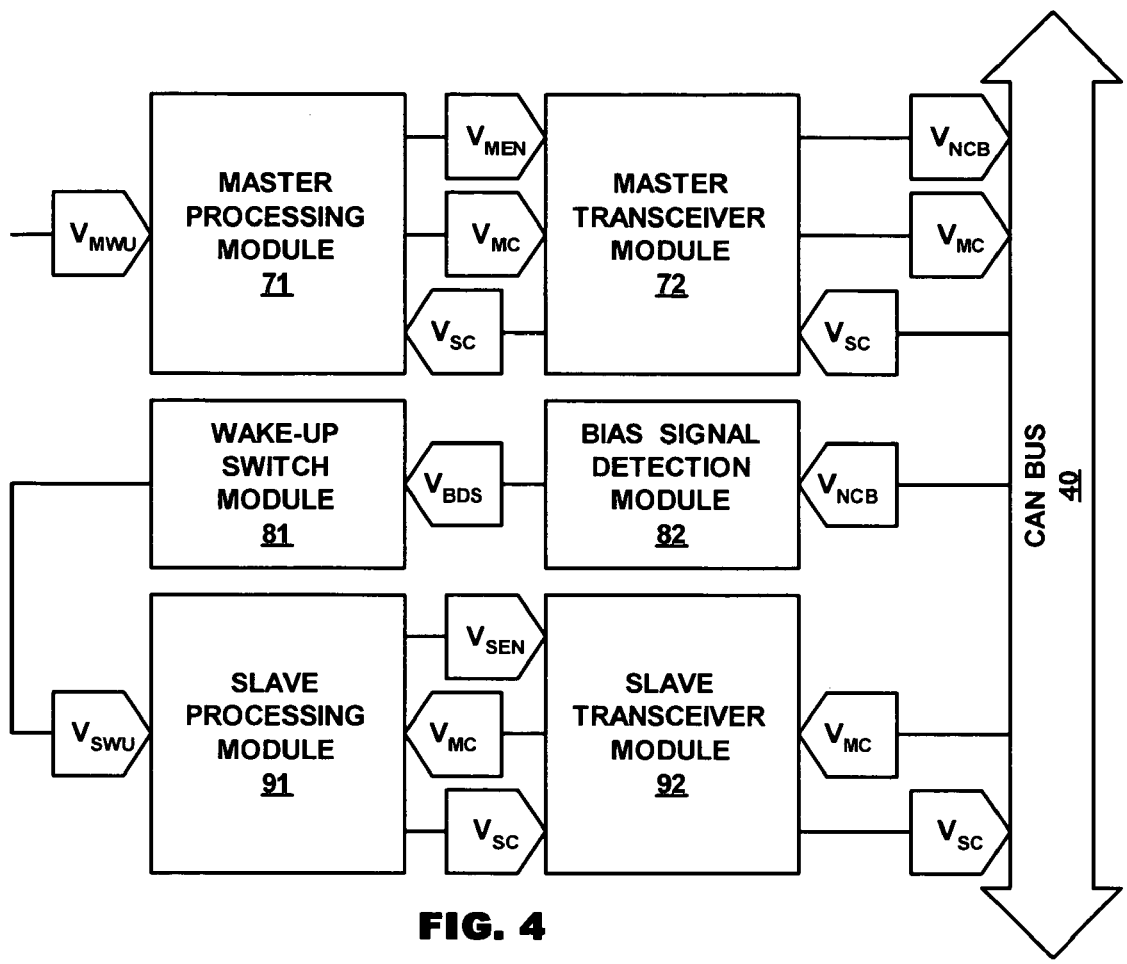
FIG. 4 illustrates a first embodiment in accordance with the present invention of the master controller and the slave controller illustrated in FIG. 2.

FIG. 4 illustrates exemplary embodiments of controllers 70, 80 and 90 (FIG. 2). Master communication controller 70 employs a master processing module 71 and a master transceiver module 72, which are shown in an active state whereby modules 71 and 72 are participating in CAN communications $V_{MC}$ and $V_{SC}$ via CAN bus 40. Slave controller 90 employs a slave processing module 91 and a slave transceiver module 92, which are shown in an active state whereby modules 91 and 92 are participating in CAN communications $V_{MC}$ and $V_{SC}$ via CAN bus 40. CAN wake-up controller 80 employs a wake-up switch module 81 and a bias signal detection module 82, which are shown switching modules 91 and 92 to the active state.

To this end, master wake-up signal $V_{MWU}$ being indicative of an operational requirement for modules 71 and 72 to be switched to the active state is electrically communicated to master processing module 71. Upon and during an electrical communication of master wake-up signal $V_{MWU}$, master processing module 71 is structurally configured to implement conventional CAN techniques to thereby facilitate a participation by modules 71 and 72 in CAN communications $V_{MC}$ and $V_{SC}$ via CAN bus 40 as well as a participation by master processing module 71 in any other necessary operational communications (e.g., communications with master device 20 illustrated in FIG. 1). Therefore, in the active state, master processing module 71 is further structurally configured to generate a master enable signal $V_{MEN}$ for switching master transceiver module 72 to the active state.

Upon and during a generation of master enable signal $V_{MEN}$, master processing module 71 electrically communicates master enable signal $V_{MEN}$ to master transceiver module 72, which is structurally configured in a new and unique manner to generate non-interfering communication biasing signal $V_{NCB}$ as an indication of being switched to the active state. Upon and during a generation of non-interfering communication biasing signal $V_{NCB}$, master transceiver module 72 applies non-interfering communication biasing signal $V_{NCB}$ to CAN bus 40. In an embodiment of CAN bus 40 having two (2) conventional bus lines, master transceiver module 72 applies non-interfering communication biasing signal $V_{NCB}$ as a voltage equal to a normal recessive voltage of CAN bus 40 (e.g., 2.5 volts).

The magnitude of the non-interfering communication biasing signal $V_{NCB}$ is insufficient to interfere in CAN communications $V_{MC}$ and $V_{SC}$ via CAN bus 40, yet sufficient to be detected by bias signal detection module 82. To this end, bias signal detection module 82 is structurally configured to generate a bias detection signal $V_{BDS}$ upon and during a detection of an application of non-interfering communication biasing signal $V_{NCB}$ by master transceiver module 72 to CAN bus 40.

Upon and during a generation of bias detection signal $V_{BDS}$, bias signal detection module 82 electrically communicates bias detection signal $V_{BDS}$ to wake-up switch module 81, which is structurally configured to generate a slave wake-up signal $V_{SWU}$ as an indication of a detection of an application of non-interfering communication biasing signal $V_{NCB}$ by master transceiver module 72 to CAN bus 40.

Upon and during the generation of slave wake-up signal $V_{SWU}$, wake-up switch module 81 electrically communicates slave wake-up signal $V_{SWU}$ to slave processing module 91, which is structurally configured to implement conventional CAN techniques upon and during an electrical communication of slave wake-up signal $V_{SWU}$ to thereby facilitate a participation by modules 91 and 92 in CAN communications $V_{MC}$ and $V_{SC}$ via CAN bus 40 as well as a participation by slave processing module 91 in any other necessary operational communications (e.g., communications with slave device 60 illustrated in FIG. 1). Therefore, in the active state, slave processing module 91 is further structurally configured to generate a slave enable signal $V_{SEN}$ for switching slave transceiver module 92 to the active state.

Figure 5:
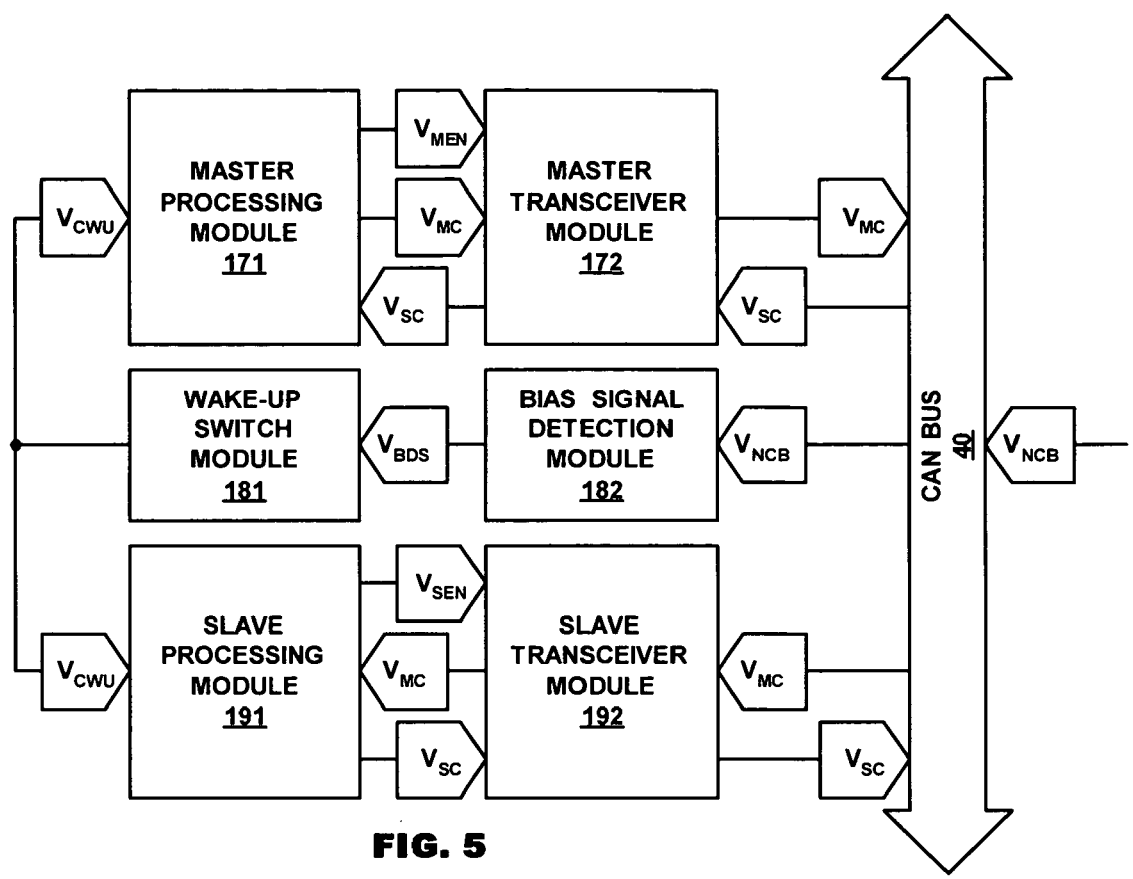
FIG. 5 illustrates a second embodiment in accordance with the present invention of the master controller and the slave controller illustrated in FIG. 3.

In an alternative embodiment to FIG. 4, FIG. 5 illustrates an application of non-interfering communication biasing signal $V_{NCB}$ to CAN bus 40 from a source that is irrelevant for purposes of understanding the principles of the present invention. However, those skilled in the art will appreciate various sources that may serve to apply non-interfering communication biasing signal $V_{NCB}$ to CAN bus 40 (e.g., a voltage divider connected to a battery of a vehicle during time periods other than a "key-off" condition).

In this embodiment, a bias signal detection module 182 is structurally configured to generate bias detection signal $V_{BDS}$ upon and during a detection of an application of non-interfering communication biasing signal $V_{NCB}$ to CAN bus 40. Upon and during a generation of bias detection signal $V_{BDS}$, bias signal detection module 182 electrically communicates bias detection signal $V_{BDS}$ to a wake-up switch module 181, which is structurally configured to generate CAN wake-up signal $V_{CWU}$ as an indication of a detection of an application of non-interfering communication biasing signal $V_{NCB}$ to CAN bus 40.

Upon and during the generation of CAN wake-up signal $V_{CWU}$, wake-up switch module 181 electrically communicates CAN wake-up signal $V_{CWU}$ to a master processing module 171 and a slave processing module 191.

Master processing module 171 is structurally configured to implement conventional CAN techniques upon and during an electrical communication of CAN wake-up signal $V_{CWU}$ to thereby facilitate a participation by modules 171 and 172 in CAN communications $V_{MC}$ and $V_{SC}$ via CAN bus 40 as well as a participation by master processing module 171 in any other necessary operational communications. Therefore, in the active state, master processing module 171 is further structurally configured to generate master enable signal $V_{MEN}$ for switching slave transceiver module 172 to the active state.

Similarly, slave processing module 191 is structurally configured to implement conventional CAN techniques upon and during an electrical communication of CAN wake-up signal $V_{CWU}$ to thereby facilitate a participation by modules 191 and 192 in CAN communications $V_{MC}$ and $V_{SC}$ via CAN bus 40 as well as a participation by slave processing module 191 in any other necessary operational communications. Therefore, in the active state, slave processing module 191 is further structurally configured to generate slave enable signal $V_{SEN}$ for switching slave transceiver module 192 to the active state.

As compared to master transceiver module 72 (FIG. 4), the structural configuration of master transceiver module 172 can either (1) omit the capability of applying non-interfering communication biasing signal $V_{NCB}$ to CAN bus 40, (2) provide for a selective activation/deactivation of the capability of applying non-interfering communication biasing signal $V_{NCB}$ to CAN bus 40, or (3) provide for a capability of applying a portion of non-interfering communication biasing signal $V_{NCB}$ to CAN bus 40 while the remaining portion of non-interfering communication biasing signal $V_{NCB}$ to CAN bus 40 is applied to CAN bus 40 by another source.

Referring to FIGS. 4 and 5, each module can employ one or more components that are assembled as a common unit, and for the multiple component units, the components of each controller may be distributed throughout the controller area network. The component(s) of each module may employ digital circuitry, analog circuitry, or both (e.g. an application specific integrated circuit). Also, the component(s) of each module may be programmable hardware, a dedicated state machine, or a hybrid combination of programmable and dedicated hardware. Additionally, all signals illustrated in FIGS. 4 and 5 can be in analog form or in digital form, and can be generated as a voltage or a current. Furthermore, to implement the principals of the present invention, each module can further employ any control clocks, interfaces, signal conditioners, filters, Analog-to-Digital (A/D) converters, Digital-to-Analog (D/A) converters, communication ports, or other types of operators as would occur to those having ordinary skill in the art.

In practice, the structural configurations of the modules illustrated in FIGS. 4 and 5 are dependent upon the commercial implementations of the modules. The inventor of the present invention therefore does not place any restrictions as to the structural configurations of the modules illustrated in FIGS. 4 and 5.

Figure 6:
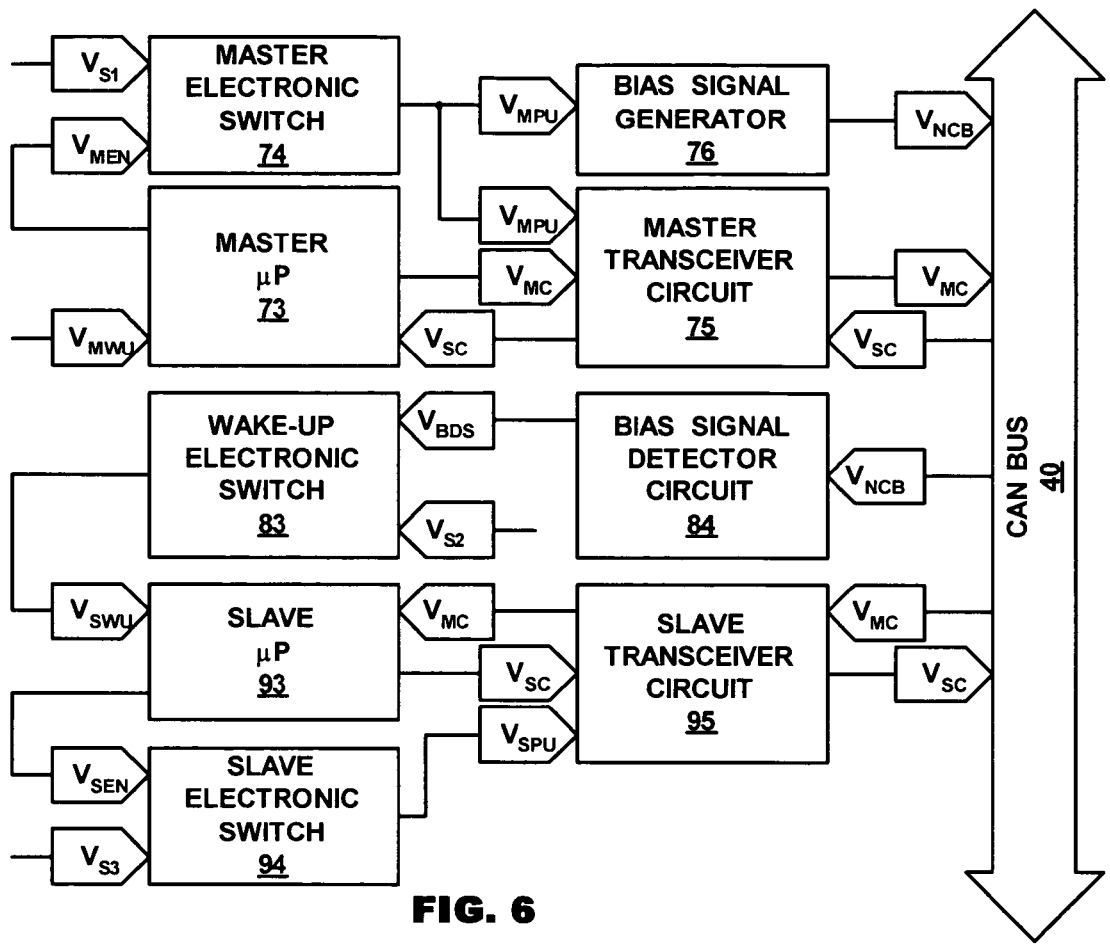
FIG. 6 illustrates a first embodiment in accordance with the present invention of the master controller and the slave controller illustrated in FIG. 4.

FIG. 6 illustrates exemplary embodiments of the modules illustrated in FIG. 4. Specifically, master processing module 71 (FIG. 4) employs a master microprocessor ("μP") 73, and master transceiver module 72 (FIG. 4) employs a master electronic switch 74, a master transceiver circuit 75, and a bias signal generator 76. Slave processing module 91 (FIG. 4) employs a slave microprocessor ("μP") 93, and slave transceiver module 92 (FIG. 4) employs a slave electronic switch 94, and a slave transceiver circuit 95. Wake-up switch module 81 (FIG. 4) employs a wake-up electronic switch 83 and bias signal detection module 82 (FIG. 4) employs a bias signal detector circuit 84. Switch 83 and circuit 84 are shown switching the master components and the slave components to the active state whereby the master components and the slave components are able to participate in CAN communications $V_{MC}$ and $V_{SC}$ via CAN bus 40.

To this end, master wake-up signal $V_{MWU}$ being indicative of an operational requirement for master microprocessor 73 and master transceiver circuit 75 to be switched to the active state is electrically communicated to master microprocessor 73. Upon and during an electrical communication of master wake-up signal $V_{MWU}$, master microprocessor 73 implements conventional CAN techniques to thereby facilitate a participation by master microprocessor 73 and master transceiver circuit 75 in CAN communications $V_{MC}$ and $V_{SC}$ via CAN bus 40 as well as a participation by master microprocessor 73 in any other necessary operational communications (e.g., communications with master device 20 illustrated in FIG. 1). Therefore, in the active state, master microprocessor 73 generates a master enable signal $V_{MEN}$ for activating master electronic switch 74 to apply a portion or a whole of a voltage source $V_{S1}$ as a master power-up signal $V_{MPU}$ to master transceiver circuit 75 and bias signal generator 76.

An application of master power-up signal $V_{MPU}$ to master transceiver circuit 75 switches master transceiver circuit 75 to the active state. An application of master power-up signal $V_{MPU}$ to bias signal generator 76 causes generator 76 to generate non-interfering communication biasing signal $V_{NCB}$ as an indication of master microprocessor 73 and master transceiver circuit 75 being switched to the active state. Upon and during a generation of non-interfering communication biasing signal $V_{NCB}$, bias signal generator 76 applies non-interfering communication biasing signal $V_{NCB}$ to CAN bus 40. In an embodiment of CAN bus 40 having two (2) conventional bus lines, bias signal generator 76 applies a portion or a whole of master power up-signal $V_{MPU}$ as non-interfering communication biasing signal $V_{NCB}$ as a voltage equal to a normal recessive voltage of CAN bus 40 (e.g., 2.5 volts).

The magnitude of the non-interfering communication biasing signal $V_{NCB}$ is insufficient to interfere in CAN communications $V_{MC}$ and $V_{SC}$ via CAN bus 40, yet sufficient to be detected by bias signal detection circuit 84. To this end, bias signal detection circuit 84 generates bias detection signal $V_{BDS}$ upon and during a detection of an application of non-interfering communication biasing signal $V_{NCB}$ by bias signal generator 76 to CAN bus 40.

Upon and during a generation of bias detection signal $V_{BDS}$, bias signal detection circuit 84 electrically communicates bias detection signal $V_{BDS}$ to wake-up electronic switch 83, which applies a portion or a whole of a voltage source $V_{S2}$ as a slave wake-up signal $V_{SWU}$ to slave microprocessor 93 whereby slave wake-up signal $V_{SWU}$ indicates a detection of an application of non-interfering communication biasing signal $V_{NCB}$ by bias signal generator 76 to CAN bus 40.

Upon and during the generation of slave wake-up signal $V_{SWU}$, slave microprocessor 93 implements conventional CAN techniques to thereby facilitate a participation by slave microprocessor 93 and slave transceiver circuit 95 in CAN communications $V_{MC}$ and $V_{SC}$ via CAN bus 40 as well as a participation by slave microprocessor 93 in any other necessary operational communications (e.g., communications with slave device 60 illustrated in FIG. 1). Therefore, in the active state, slave microprocessor 93 generates a slave enable signal $V_{SEN}$ for activating slave electronic switch 94 to apply a portion or a whole of a voltage source $V_{S3}$ as a slave power-up signal $V_{SPU}$ to slave transceiver circuit 95. An application of slave power-up signal $V_{SPU}$ to slave transceiver circuit 95 switches slave transceiver circuit 95 to the active state.

Figure 7:
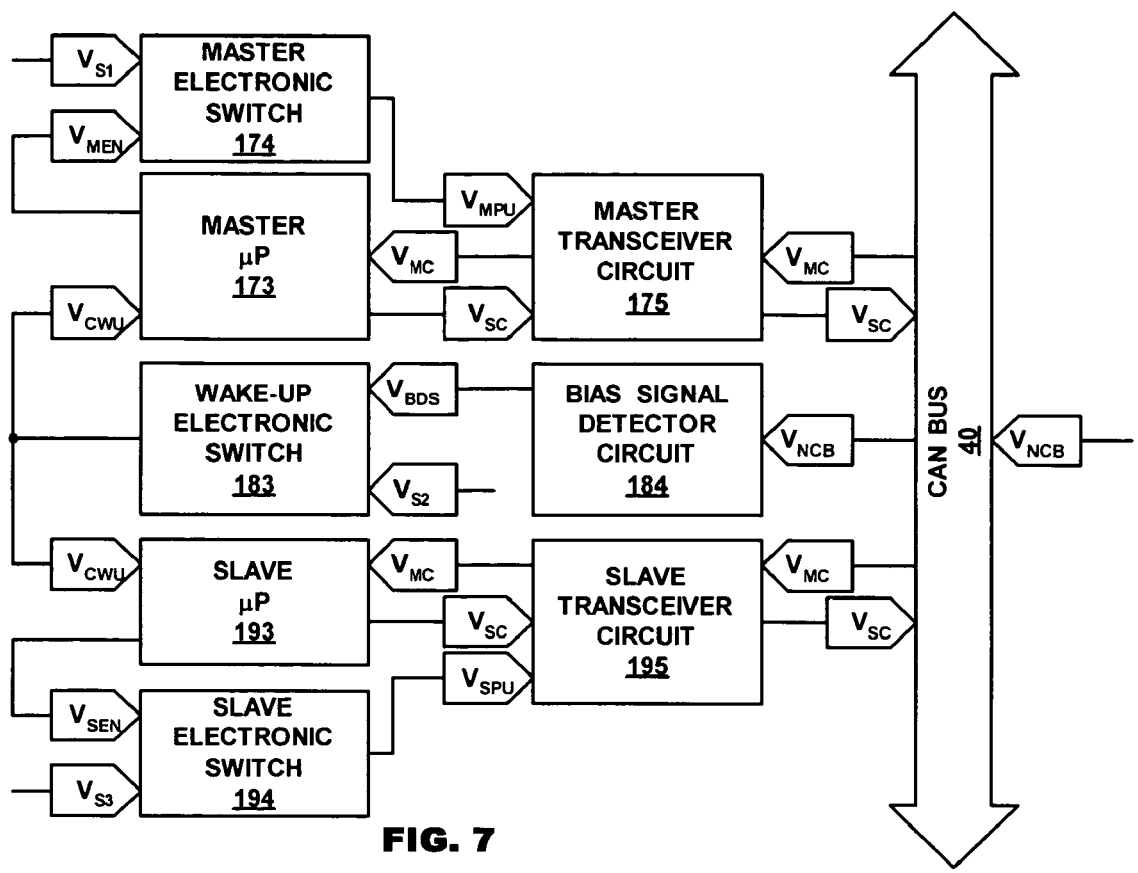
FIG. 7 illustrates a second embodiment in accordance with the present invention of the master controller and the slave controller illustrated in FIG. 5.

In an alternative embodiment to FIG. 6, FIG. 7 illustrates an application of non-interfering communication biasing signal $V_{NCB}$ to CAN bus 40 from a source that is irrelevant for purposes of understanding the principles of the present invention. However, those skilled in the art will appreciate various sources that may serve to apply non-interfering communication biasing signal $V_{NCB}$ to CAN bus 40 (e.g., a voltage divider connected to a battery of a vehicle during time periods other than a "key-off" condition).

The magnitude of the non-interfering communication biasing signal $V_{NCB}$ is insufficient to interfere in CAN communications $V_{MC}$ and $V_{SC}$ via CAN bus 40, yet sufficient to be detected by s bias signal detection circuit 184. To this end, bias signal detection circuit 184 generates bias detection signal $V_{BDS}$ upon and during a detection of an application of non-interfering communication biasing signal $V_{NCB}$ to CAN bus 40.

Upon and during a generation of bias detection signal $V_{BDS}$, bias signal detection circuit 184 electrically communicates bias detection signal $V_{BDS}$ to a wake-up electronic switch 183, which applies a portion or a whole of a voltage source $V_{S2}$ as a CAN wake-up signal $V_{CWU}$ to microprocessors 173 and 193. CAN wake-up signal $V_{CWU}$ serves as an indication of a detection of an application of non-interfering communication biasing signal $V_{NCB}$ to CAN bus 40.

Upon and during the generation of CAN wake-up signal $V_{CWU}$, master microprocessor 173 implements conventional CAN techniques to thereby facilitate a participation by master microprocessor 173 and master transceiver circuit 175 in CAN communications $V_{MC}$ and $V_{SC}$ via CAN bus 40 as well as a participation by master microprocessor 173 in any other necessary operational communications (e.g., communications with master device 20 illustrated in FIG. 1). Therefore, in the active state, master microprocessor 173 generates a master enable signal $V_{MEN}$ for activating master electronic switch 174 to apply a portion or a whole of a voltage source $V_{S1}$ as a master power-up signal $V_{MPU}$ to master transceiver circuit 175. An application of master power-up signal $V_{MPU}$ to master transceiver circuit 175 switches master transceiver circuit 175 to the active state.

Similarly, upon and during the generation of CAN wake-up signal $V_{CWU}$, slave microprocessor 193 implements conventional CAN techniques to thereby facilitate a participation by slave microprocessor 193 and slave transceiver circuit 195 in CAN communications $V_{MC}$ and $V_{SC}$ via CAN bus 40 as well as a participation by slave microprocessor 193 in any other necessary operational communications (e.g., communications with slave device 60 illustrated in FIG. 1). Therefore, in the active state, slave microprocessor 193 generates a slave enable signal $V_{SEN}$ for activating slave electronic switch 194 to apply a portion or a whole of a voltage source $V_{S3}$ as a slave power-up signal $V_{SPU}$ to slave transceiver circuit 195. An application of slave power-up signal $V_{SPU}$ to slave transceiver circuit 195 switches slave transceiver circuit 195 to the active state.

In practice, the structural configurations of the components illustrated in FIGS. 6 and 7 are dependent upon the commercial implementations of the components. The inventor of the present invention therefore does not place any restrictions as to the types and forms of the components illustrated in FIGS. 6 and 7.

Figure 8:
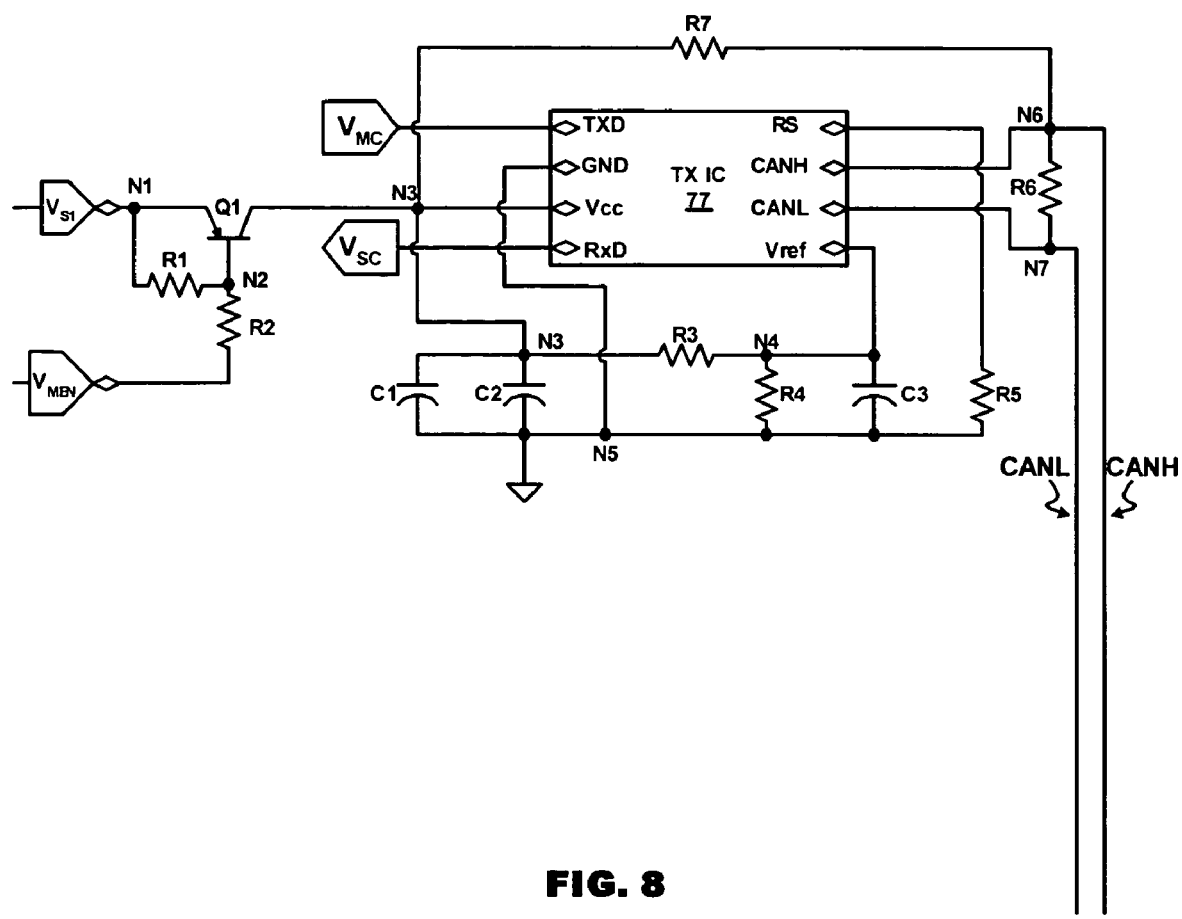
FIG. 8 illustrates one embodiment in accordance with the present invention of a master electronic switch, a bias signal generator, and a master transceiver circuit illustrated in FIG. 6.

FIG. 8 illustrates an exemplary embodiment of master electronic switch 74 (FIG. 6) employing a PNP bipolar transistor Q1, a resistor R1 (e.g., 1.00K ohms) and a resistor R2 (e.g.,1.00K ohms).

Resistor R1, and an emitter of transistor Q1 are electrically connected to a node N1.

Resistor R1, resistor R2, and a base of transistor Q1 are electrically connected to a node N2.

A collector of transistor Q1 is electrically connected to a node N3.

FIG. 8 further illustrates an exemplary embodiment of master transceiver circuit 75 (FIG. 6) employing a transceiver integrated circuit ("TX IC") 77, a resistor R3 (e.g., a 10.0 k ohms), a resistor R4 (e.g., 10.0 k ohms), a resistor R5 (e.g., 24.9K ohms), a resistor R6 (e.g., 121 ohms), a capacitor C1 (e.g., a 10 nanofarads), a capacitor C2 (e.g., a 0.1 microfarads), and a capacitor C3 (e.g., a 0.1 microfarads).

A Vcc pin of TX IC 77, capacitor C1, capacitor C2, and resistor R3 are electrically connected to node N3.

A Vref pin of TX IC 77, resistor R3, resistor R4, and capacitor C3 are electrically connected to node N4.

A GND pin of TX IC 77, capacitor C1, capacitor C2, resistor R4, capacitor C3, and resistor R5 are electrically connected to a node N5.

Resistor R5 is electrically connected to a RS pin of TX IC 77.

A CANH pin of TX IC 77 and resistor R6 are electrically connected to a node N6.

A CANL pin of TX IC 77 and resistor R6 are electrically connected to a node N7.

FIG. 8 further illustrates an exemplary embodiment of bias signal generator 76 (FIG. 6) employing a resistor R7 (e.g., 10.0 k ohms), which is electrically connected to node N3 and node N6.

Figure 9:
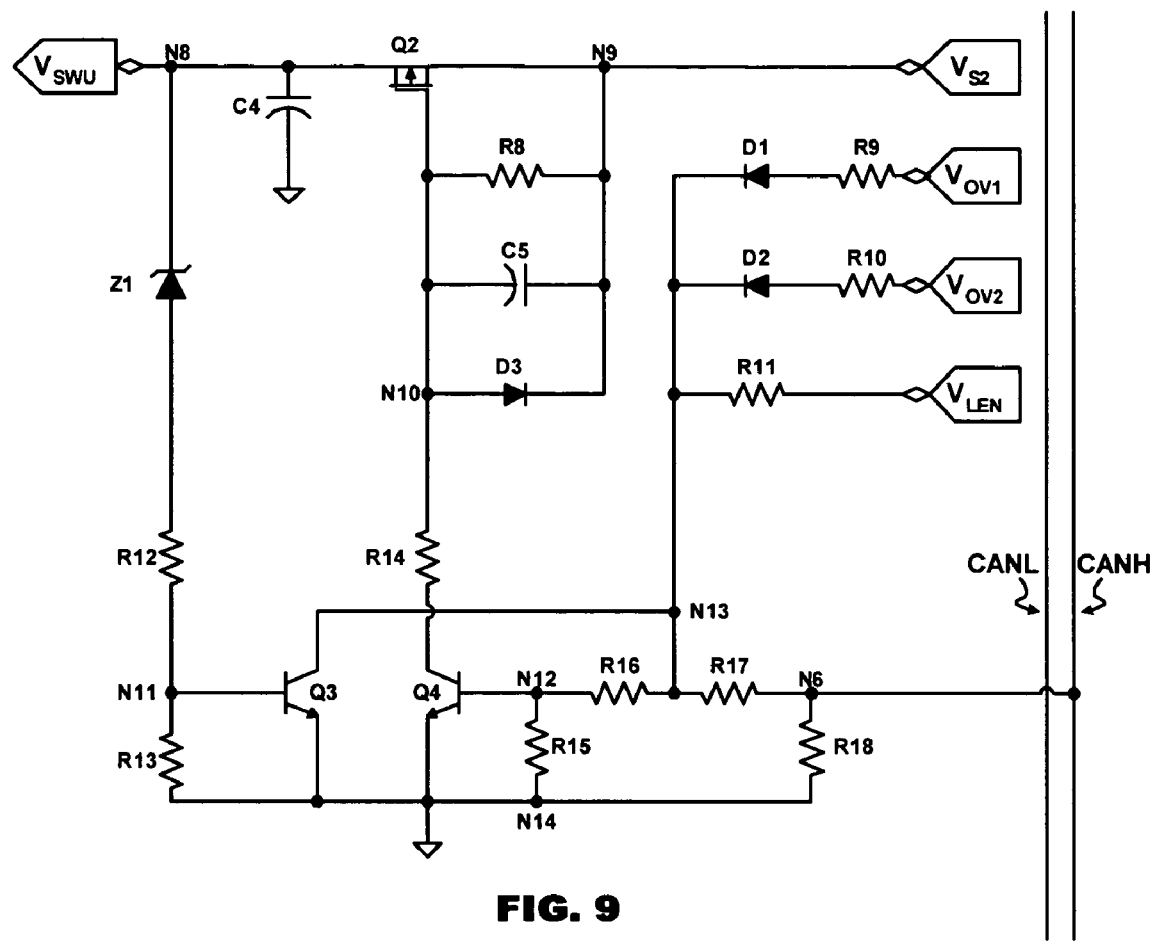
FIG. 9 illustrates one embodiment in accordance with the present invention of a bias signal detector circuit and a wake-up electronic switch illustrated in FIG. 6.

FIG. 9 illustrates an exemplary embodiment of bias signal detection circuit 84 (FIG. 6) employing a resistor R14 (e.g., 499 ohms), a NPN transistor Q4, a resistor R15 (e.g., 24.0 k ohms), a resistor R16 (e.g., 10.0 k ohms), a resistor R17 (e.g., 10.0 k ohms), and a resistor R18 (e.g., 24.0 k ohms).

Resistor R14 is electrically connected to a collector of transistor Q4 and a node N10.

A base terminal and an emitter terminal of transistor Q4 are electrically connected to a node N12 and a node N14, respectively.

Resistor R15 is electrically connected to node N12 and node N14.

Resistor R16 is electrically connected to node N12 and node N13.

Resistor R17 is electrically connected to node N13 and node N6.

Resistor R18 is electrically connected to node N14 and node N6.

FIG. 9 further illustrates an exemplary embodiment of wake-up electronic switch 83 (FIG. 6) employing a diode D3, a capacitor C5 (e.g., 10 nanofarads), a resistor R8 (e.g., 4.99 k ohms), a MOSFET transistor Q2, and a capacitor C4 (e.g., 220 microfarads).

Diode D3, capacitor C5, and resistor R8 are electrically connected to a node N9 and node N10.

A gate of transistor Q2 is electrically connected to node N10, a source of transistor Q2 is electrically connected to a node N9, and a drain of transistor Q2 is electrically connected to a node N8.

Capacitor C4 is electrically connected to node N8 and node N14.

A zener diode Z1, a resistor R12 (e.g., 1.00 k ohms), a resistor 13 (e.g., 2.49 k ohms), and a NPN transistor Q3 constitute a regulator for regulating transistor Q3 whenever transistor Q3 is turned on and slave wake-up signal $V_{SWU}$ exceeds a regulation threshold.

Zener diode Z1 is electrically connected to node N8 and resistor R12, which is also electrically connected to a node N11.

Resistor R13 is electrically connected to node N11 and node N14.

A base of transistor Q3 is electrically connected to a node N11, a collector of transistor Q3 is electrically connected to node N13, and an emitter of transistor Q3 is electrically connected to node N14.

A resistor R9 (e.g., 24 k ohms) and a diode D1 are electrically connected in series to node N13, and a resistor R10 (e.g., 24 k ohms) and a diode D2 are electrically connected in series to node N13 whereby a slave overriding signal $V_{OV1}$ and a slave overriding signal $V_{OV2}$ can be utilized to turn on transistor Q4 in the case of emergencies or an operational failure for whatever reason to thereby properly operate transistors Q3 and Q4 as if the non-interfering communication biasing signal $V_{NCB}$ were being applied to CAN bus 40.

A resistor R11 (e.g., 4.99 k ohms) is electrically connected to node N13 whereby a latch enable signal $V_{LEN}$ can be applied to keep transistor Q4 on during a shut down of slave microprocessor 93 (FIG. 6) until such time the shut down of slave microprocessor 93 is complete.

Figure 10:
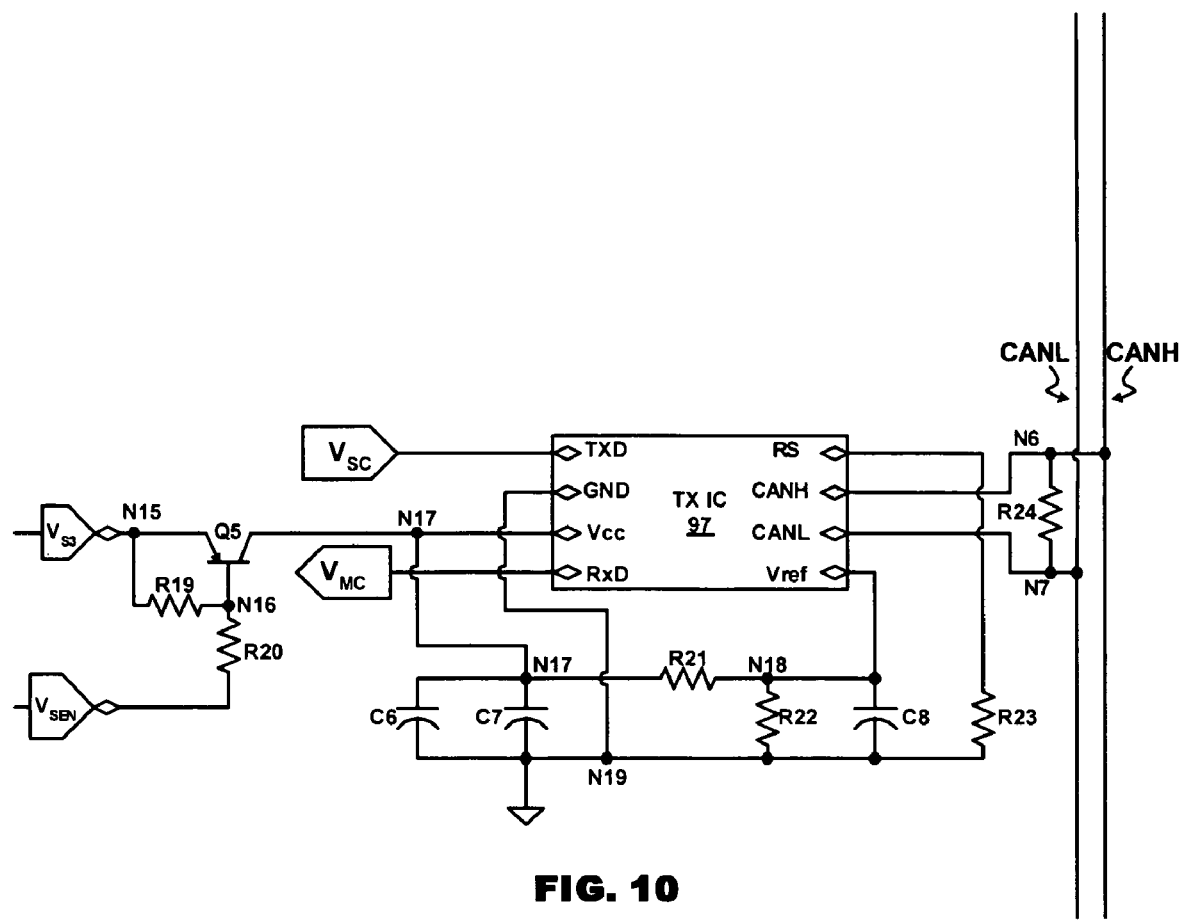
FIG. 10 illustrates one embodiment in accordance with the present invention of a slave electronic switch and a slave transceiver circuit illustrated in FIG. 6.

FIG. 10 illustrates an exemplary embodiment of slave electronic switch 94 (FIG. 6) employing a PNP bipolar transistor Q5, a resistor R19 (e.g., 1.00K ohms) and a resistor R20 (e.g.,1.00K ohms).

Resistor R19, and an emitter of transistor Q5 are electrically connected to a node N15.

Resistor R19, resistor R20, and a base of transistor Q5 are electrically connected to a node N16.

A collector of transistor Q5 is electrically connected to a node N17.

FIG. 10 further illustrates an exemplary embodiment of slave transceiver circuit 95 (FIG. 6) employing a transceiver integrated circuit ("TX IC") 97, a resistor R21 (e.g., a 10.0 k ohms), a resistor R22 (e.g., 10.0 k ohms), a resistor R23 (e.g., 24.9K ohms), a resistor R24 (e.g., 121 ohms), a capacitor C6 (e.g., a 10 nanofarads), a capacitor C7 (e.g., a 0.1 microfarads), and a capacitor C8 (e.g., a 0.1 microfarads).

A Vcc pin of TX IC 97, capacitor C6, capacitor C7, and resistor R21 are electrically connected to node N17.

A Vref pin of TX IC 97, resistor R21, resistor R22, and capacitor C8 are electrically connected to node N18.

A GND pin of TX IC 97, capacitor C6, capacitor C7, resistor R22, capacitor C8, and resistor R23 are electrically connected to a node N19.

Resistor R23 is electrically connected to a RS pin of TX IC 97.

A CANH pin of TX IC 97 and resistor R24 are electrically connected to a node N6.

A CANL pin of TX IC 97 and resistor R24 are electrically connected to a node N7.

The following TABLE 1 exemplary illustrates an operation of FIGS. 8–10 in view of the exemplary listings of the illustrated components.

TABLE 1

| Signals/Transistors | Communication States | |
|---|---|---|
| | Inactive State | Active State |
| Voltage Sources $V_{S1}$, $V_{S3}$ | 5 volts | 5 volts |
| Voltage Source $V_{S2}$ | 9–16 volts | 9–16 volts |
| Master Enable Signal $V_{MEN}$ (FIG. 6) (from μP 73) | Logic High | Logic Low |
| Transistor Q1 | Off | On |
| Master Power-Up Signal $V_{MPU}$ (FIG. 6) (applied to node N3) | 0 Volts | $V_{S1}$–$V_{Q1}$ |
| Non-Interfering Communication Biasing signal $V_{NCB}$ (FIG. 6) (applied to node N6) | 0 Volts | $V_{MPU}$–$V_{R7}$ |
| Transistor Q4 | Off | On |
| Transistor Q2 | Off | On |
| Slave Wake-Up Signal $V_{SWU}$ (FIG. 6) (applied to node N8) | 0 Volts | $V_{S2}$–$V_{Q2}$ |
| Slave Enable Signal $V_{SEN}$ (FIG. 6) (from μP 93) | Logic High | Logic Low |
| Transistor Q5 | Off | On |
| Slave Power-Up Signal $V_{SPU}$ (FIG. 6) (applied to node N17) | 0 Volts | $V_{S3}$–$V_{Q5}$ |

From the description herein of the present invention, those having ordinary skill in the art will appreciate the dual role of CAN bus 40 as a communication bus and a wake-up bus. Those having ordinary skill in the art will further appreciate that the application of the principles of the present invention to any configuration of a CAN network. For example, a CAN network employing multiple master controllers wherein one or more of the master controllers can, individually or collectively, apply the non-interfering communication biasing signal $V_{NCB}$ to CAN bus 40, and the remaining master controllers can detect the application of the non-interfering communication biasing signal $V_{NCB}$ to CAN bus 40. Also by example, a CAN network employing one or more slave controllers having the capability of, individually or collectively, applying the non-interfering communication biasing signal $V_{NCB}$ to CAN bus 40 wherein the other controllers, master or slave, can detect the application of the non-interfering communication biasing signal $V_{NCB}$ to CAN bus 40. By further example, a CAN network employing controllers that are not designated as master or slaves wherein one or more of the master controllers can, individually or collectively, apply the non-interfering communication biasing signal $V_{NCB}$ to CAN bus 40, and the remaining controllers can detect the application of the non-interfering communication biasing signal $V_{NCB}$ to CAN bus 40.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A controller area network, comprising:
   a CAN bus operable to facilitate CAN communications;
   a plurality of communication controllers in electrical communication with said CAN bus,
   wherein each communication controller is operable in an active state to participate in CAN communications among said plurality of communication controllers via said CAN bus, and
   wherein each communication controller is inoperable in an inactive state to participate in CAN communications among said plurality of communication controllers via said CAN bus; and
   a CAN wake-up controller in electrical communication with said CAN bus and at least one of said communication controllers,
   wherein said CAN wake-up controller is operable to switch said at least one of said communication controllers to the active state in response to an application of a non-interfering communication biasing signal to said CAN bus, and
   wherein said CAN wake-up controller is operable to switch said at least one of said communication controllers to the inactive state in response to a termination of the application of the non-interfering communication biasing signal to said CAN bus.

2. The controller area network of claim 1, wherein said plurality of communication controllers includes a first communication controller operable to apply the non-interfering communication biasing signal to said CAN bus.

3. The controller area network of claim 2, wherein said first communication controller is operable to receive an electrical communication of a wake-up signal indicative of a requirement to switch the first communication controller to the active state.

4. The controller area network of claim 3, wherein said first communication controller includes:
a processing module operable to be switched to the active state in response to the wake-up signal being electrically communicated to said first communication controller,
wherein said processing module generates an enable signal in response to being switched to the active state; and
a transceiver module operable to be switched to the active state in response to a generation of the enable signal by said processing module,
wherein said transceiver module generates the non-interfering communication biasing signal in response to being switched to the active state.

5. The controller area network of claim 4, wherein said processing module includes a microprocessor operable in the active state to implement at least one CAN communication technique for facilitating a participation by said first communication controller in CAN communications among said plurality of communication controllers via said CAN bus.

6. The controller area network of claim 4, wherein said transceiver module includes:
a transceiver circuit operable in the active state to facilitate a participation in CAN communications by said first communication controller among said plurality of communication controllers via said CAN bus; and
an electronic switch operable to apply at least a portion of a voltage source serving as a power-up signal to said transceiver circuit in response to a generation of the enable signal by said processing module,
wherein said transceiver circuit is switched to the active state in response to the application of the power-up signal by said electronic switch to said transceiver circuit.

7. The controller area network of claim 4, wherein said transceiver module includes:
a bias signal generator operable to generate the non-interfering communication biasing signal in response to an application of a power-up signal to said bias signal generator; and
an electronic switch operable to apply at least a portion of a voltage source serving as the power-up signal to said bias signal generator in response to a generation of the enable signal by said processing module.

8. The controller area network of claim 2, wherein said first communication controller is operable to receive a wake-up signal indicative of a requirement to switch said first communication controller to the active state.

9. The controller area network of claim 8, wherein said first communication controller includes:
a processing module operable to be switched to the active state in response to the wake-up signal being electrically communicated to said first communication controller,
wherein said processing module generates an enable signal in response to being switched to the active state; and
a transceiver module operable to be switched to the active state in response to a generation of the enable signal by said processing module.

10. The controller area network of claim 9, wherein said processing module includes a microprocessor operable in the active state to implement at least one CAN communication technique for facilitating a participation by said first communication controller in CAN communications among said plurality of communication controllers via said CAN bus.

11. The controller area network of claim 9, wherein said transceiver module includes:
a transceiver circuit operable in the active state to facilitate a participation in CAN communications by said first communication controller among said plurality of communication controllers via said CAN bus; and
an electronic switch operable to apply at least a portion of a voltage source serving as a power-up signal to said transceiver circuit in response to a generation of the enable signal by said processing module,
wherein said transceiver circuit is switched to the active state in response to the application of the power-up signal by said electronic switch to said transceiver circuit.

12. The controller area network of claim 1, wherein said CAN wake-up controller includes:
a bias signal detection module operable to detect the application of the non-interfering communication biasing signal to said CAN bus; and
a wake-up switch module operable to generate a wake-up signal in response to a detection by said bias signal detection module of the application of the non-interfering communication biasing signal to said CAN bus.

13. The controller area network of claim 12, wherein a first communication controller is operable to receive an electrical communication from said CAN wake-up controller of the wake-up signal indicative of a requirement to switch the first communication controller to the active state.

14. The controller area network of claim 13, wherein said first communication controller includes:
a processing module operable to be switched to the active state in response to the wake-up signal being electrically communicated to said first communication controller,
wherein said processing module generates an enable signal in response to being switched to the active state; and
a transceiver module operable to be switched to the active state in response to a generation of the enable signal by said processing module.

15. The controller area network of claim 14, wherein said processing module includes a microprocessor operable in the active state to implement at least one CAN communication technique for facilitating a participation by said first communication controller in CAN communications among said plurality of communication controllers via said CAN bus.

16. The controller area network of claim 14, wherein said transceiver module includes:
a transceiver circuit operable in the active state to facilitate a participation in CAN communications by said first communication controller among said plurality of communication controllers via said CAN bus; and
an electronic switch operable to be operable to apply at least a portion of a voltage source serving as a power-up signal to said transceiver circuit in response to a generation of the enable signal by said processing module,
wherein said transceiver circuit is switched to the active state in response to the application of the power-up signal by said electronic switch to said transceiver circuit.

17. The controller area network of claim 12, wherein said wake-up switch module includes a wake-up electronic switch operable to apply at least a portion of a voltage source as the wake-up signal to a first communication controller in response to a detection by said bias signal detection module of the application of the non-interfering communication biasing signal to said CAN bus.

18. A method of operating a controller area network employing a plurality of communication controllers and a CAN bus, the method comprising:
  applying a non-interfering communication biasing signal to the CAN bus;
  switching a first communication controller to an active state in response to the application of the non-interfering communication biasing signal to the CAN bus,
  wherein the first communication controller switches to an active state to thereby participate in CAN communications among the plurality of communication controllers via said CAN bus;
  receiving an electrical communication of a wake-up signal indicative of a requirement for the first communication controller to be switched to the active state; and
  switching a second communication controller to the active state in response to the electrical communication of the wake-up signal whereby the second communication controller generates the non-interfering communication biasing signal in response being switched to the active state.

19. The method of claim 18, further comprising:
  detecting the application of the non-interfering communication biasing signal to the CAN bus; and
  generating a wake-up signal in response to the detection of the application of the non-interfering communication biasing signal to the CAN bus, the wake-up signal being indicative of a requirement for the first communication controller to be switched to the active state.

20. A controller area network, comprising:
  means for applying a non-interfering communication biasing signal to a CAN bus;
  means for switching a first communication controller to an active state in response to the application of the non-interfering communication biasing signal to the CAN bus,
  wherein the first communication controller switches to an active state to thereby participate in CAN communications among the plurality of communication controllers via said CAN bus;
  means for receiving an electrical communication of a wake-up signal indicative of a requirement for the first communication controller to be switched to the active state; and
  means for switching a second communication controller to the active state in response to the electrical communication of the wake-up signal whereby the second communication controller generates the non-interfering communication biasing signal in response being switched to the active state.

21. The controller area network of claim 20, further comprising:
  means for detecting the application of the non-interfering communication biasing signal to the CAN bus; and
  means for generating a wake-up signal in response to the detection of the application of the non-interfering communication biasing signal to the CAN bus, the wake-up signal being indicative of a requirement for the first communication controller to be switched to the active state.

* * * * *